(12) United States Patent
Walsh

(10) Patent No.: US 9,027,151 B2
(45) Date of Patent: May 5, 2015

(54) INHIBITING DENIAL-OF-SERVICE ATTACKS USING GROUP CONTROLS

(75) Inventor: Daniel J. Walsh, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 97 days.

(21) Appl. No.: 13/029,702

(22) Filed: Feb. 17, 2011

(65) Prior Publication Data

US 2012/0216285 A1 Aug. 23, 2012

(51) Int. Cl.
*G06F 21/00* (2013.01)
*G06F 21/53* (2013.01)
*H04L 29/06* (2006.01)

(52) U.S. Cl.
CPC ............ *G06F 21/53* (2013.01); *H04L 63/1458* (2013.01); *G06F 2221/2101* (2013.01); *G06F 2221/2149* (2013.01); *G06F 2221/2141* (2013.01)

(58) Field of Classification Search
CPC ....................................................... G06F 21/53
USPC ..................... 726/27, 26, 22, 23, 2
See application file for complete search history.

(56) References Cited

U.S. PATENT DOCUMENTS

| | | |
|---|---|---|
| 6,446,109 B2 | 9/2002 | Gupta |
| 7,246,374 B1 | 7/2007 | Simon et al. |
| 7,340,723 B2 | 3/2008 | Antonov et al. |
| 7,380,136 B2 | 5/2008 | Zimmer et al. |
| 7,383,327 B1 | 6/2008 | Tormasov et al. |
| 7,447,896 B2 | 11/2008 | Smith et al. |
| 7,461,144 B1 | 12/2008 | Beloussov et al. |
| 7,496,576 B2 | 2/2009 | Bernabeu-Auban et al. |
| 7,526,774 B1 | 4/2009 | Beck et al. |
| 7,562,220 B2 | 7/2009 | Frank et al. |
| 7,698,400 B1 | 4/2010 | Beloussov et al. |
| 7,886,353 B2 | 2/2011 | Avraham et al. |
| 7,908,653 B2 | 3/2011 | Brickell et al. |
| 8,312,459 B2 | 11/2012 | Smith et al. |

(Continued)

OTHER PUBLICATIONS

Krsul et al.; VMPlants: Providing and Managing Virtual Machine Execution Environments for Grid Computing; Published in: Supercomputing; 2004; Proceedings of the ACM/IEEE SC2004 Conference Date of Conference: Nov. 6-12, 2004; pp. 1-12; IEEE Xplore.*

(Continued)

*Primary Examiner* — Bradley Holder
(74) *Attorney, Agent, or Firm* — Lowenstein Sandler LLP

(57) ABSTRACT

A sandbox tool can cooperate with components of a secure operating system (OS) to create an isolated execution environment for accessing content without exposing other processes and resources of the computing system to the untrusted content. The sandbox tool can utilize task control groups (cgroups) of the secure OS with the isolated execution environment. A cgroup defines the hardware resources that can be accessed and utilized by the isolated execution environment. The cgroups can define accessible hardware resources by particular hardware resources, amount of hardware resources, and/or components of the hardware resources. Once a cgroup is applied to the isolated execution environment, any processes running in the isolated execution environment will be confined to the hardware resources defined by the applied cgroup. If a process running in the isolated execution environment attempts to utilize hardware resources outside the definition of the cgroup, the secure OS can block the usage.

9 Claims, 7 Drawing Sheets

(56) References Cited

U.S. PATENT DOCUMENTS

| | | | |
|---|---|---|---|
| 8,627,451 B2 | 1/2014 | Walsh | |
| 8,640,187 B2 | 1/2014 | Walsh | |
| 8,862,590 B2 | 10/2014 | Sheehan | |
| 2002/0161869 A1* | 10/2002 | Griffin et al. | 709/221 |
| 2002/0184520 A1 | 12/2002 | Bush et al. | |
| 2003/0172109 A1 | 9/2003 | Dalton et al. | |
| 2006/0048099 A1 | 3/2006 | Templin et al. | |
| 2007/0006321 A1 | 1/2007 | Bantz et al. | |
| 2007/0050766 A1* | 3/2007 | Pomerantz | 718/1 |
| 2007/0226773 A1* | 9/2007 | Pouliot | 726/1 |
| 2008/0016339 A1* | 1/2008 | Shukla | 713/164 |
| 2008/0235806 A1 | 9/2008 | Bantz et al. | |
| 2009/0216768 A1* | 8/2009 | Zwilling et al. | 707/9 |
| 2009/0259993 A1* | 10/2009 | Konduri et al. | 717/127 |
| 2009/0276771 A1 | 11/2009 | Nickolov et al. | |
| 2010/0058016 A1* | 3/2010 | Nikara et al. | 711/163 |
| 2010/0082926 A1* | 4/2010 | Sahita et al. | 711/163 |
| 2010/0192224 A1* | 7/2010 | Ferri et al. | 726/23 |
| 2010/0274910 A1* | 10/2010 | Ghanaie-Sichanie et al. | 709/229 |
| 2011/0047613 A1 | 2/2011 | Walsh et al. | |
| 2011/0067105 A1* | 3/2011 | Wolfe et al. | 726/23 |
| 2011/0138473 A1* | 6/2011 | Yee et al. | 726/26 |
| 2011/0138474 A1* | 6/2011 | Yee et al. | 726/26 |
| 2011/0154431 A1 | 6/2011 | Walsh | |
| 2011/0296487 A1 | 12/2011 | Walsh | |
| 2011/0296529 A1* | 12/2011 | Bhanoo et al. | 726/26 |
| 2012/0159127 A1* | 6/2012 | Spradlin | 712/208 |
| 2012/0179587 A1* | 7/2012 | Hill et al. | 705/34 |

OTHER PUBLICATIONS

Sharif et al.; Secure in-VM monitoring using hardware virtualization; Published in:Proceeding CCS '09 Proceedings of the 16th ACM conference on Computer and communications security; 2009; pp. 477-487; ACM Digital Library.*

Yu et al—"A Feather-Weight Virtual Machine for Windows Applications", Jul. 2007, 11 pages.

USPTO, Office Action for 12/640,657 mailed Jun. 27, 2012.

USPTO, Final Office Action for 12/640,657 mailed Dec. 3, 2012.

USPTO, Advisory Action for 12/640,657 mailed Feb. 11, 2013.

USPTO, Office Action for 12/545,500 mailed Apr. 25, 2012.

USPTO, Final Office Action for 12/545,500 mailed Nov. 26, 2012.

USPTO, Advisory Action for 12/545,500 mailed Feb. 5, 2013.

USPTO, Office Action for 12/545,500 mailed Apr. 9, 2013.

USPTO, Office Action for Application No. 12/789,554 mailed on Aug. 16, 2012.

USPTO, Final Office Action for Application No. 12/789,554 mailed Mar. 11, 2013.

* cited by examiner

INHIBITING DENIAL-OF-SERVICE ATTACKS USING GROUP CONTROLS

FIELD

This invention relates generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Often, the users are unaware of the origin of the content available in the public networks. Malicious entities utilize this ease of accessibility and anonymity to attack the users. For example, the malicious entities can plant viruses, Trojans, or other malicious agents in publicly available content in order to attack the users' computing systems and steal sensitive information from the users. As such, the users must treat content from unknown sources as untrusted and possibly dangerous.

Typically, to prevent attacks, the users utilize filtering programs, anti-virus programs, etc. in order to identify and block known dangerous content. These programs, however, suffer from several weaknesses. In order to properly identify and block the dangerous content, the filtering and anti-virus programs must typically be configured with the identity of the source of known dangerous content. As such, the filtering and anti-virus programs lack the ability to stop previously unknown and emerging threats. Likewise, the filtering and anti-virus programs are themselves subject to attack. Many types of dangerous content utilize weaknesses in the filtering and anti-virus programs to attack the users' computing systems using the filtering and anti-virus programs as a vehicle for attacking the users' computing systems. As such, the users lack methods to guarantee that untrusted content does not pose a threat.

Currently, operating systems allow a user to place access controls on a process, such as an application program, running on the operating system. When an action by the application program exceeds it level of access, the operating system blocks the action, and the application program immediate shuts down. This prevents possible damage to the user's computing system, but it also prevents the user from using the application program. To utilize the application program, the user is required to increase the level of access granted to the application program.

Additionally, while the operating system can limit an application program's level of access, the application program still may harm the user's computing system. One suck attack is a denial-of-service (DOS) attack. In a DOS attack, a dangerous application program or a harmless application program running dangerous content attempts to render a user's computing system unusable. For example, the dangerous application program or dangerous content can utilize bugs in the computing system in order to consume all the processing power and/or memory of the computing system (e.g. buffer overflow attack, fork bomb, etc.), thereby rendering the computing system unusable or crashing the computing system. In such an attack, the dangerous application or dangerous content can still perform the attack even though it may have limited access because the attack targets the basic functions of the computing system (e.g. processing and memory). Thus, the user has no method to run the application program and also protect the computing system from potential DOS attacks.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
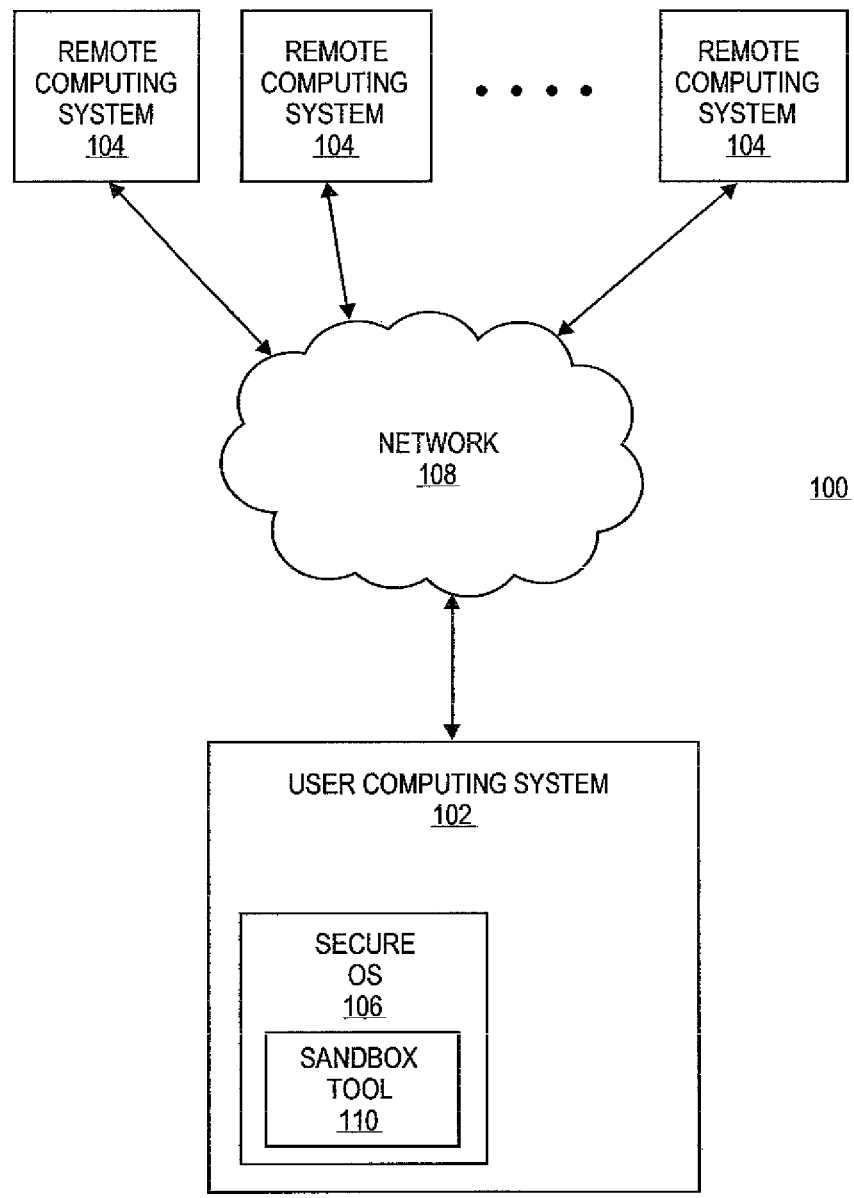
FIG. 1 illustrates a network of computing systems in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for accessing, viewing, and running content, such as data, files, programs, and applications, without exposing a computing system to untrusted content and possibly malicious content and protecting the computing system from DOS attacks. More particularly, a "sandbox tool" can create an isolated execution environment that is isolated from other processes executing on the computing system for accessing content. The sandbox tool can cooperate with components of a secure operating system (OS), such as security enhanced LINUX (SELinux), to create an isolated execution environment for accessing content without exposing other processes and resources of the computing system to the content. As such, the user can access the content without exposing the overall computing system to any possible malicious or dangerous content.

According to embodiments, the sandbox tool can be configured to utilize task control groups (cgroups) of the secure OS with the isolated execution environment. A cgroup defines the hardware resources that can be accessed and utilized by the isolated execution environment. The cgroups can define accessible hardware resources by particular hardware resources, amount of hardware resources, and/or components of the hardware resources. Once a cgroup is applied to the isolated execution environment, any processes running in the isolated execution environment will be confined to the hardware resources defined by the applied cgroup. If a process running in the isolated execution environment attempts to utilize hardware resources outside the definition of the cgroup, the secure OS can block the usage.

By utilizing the sandbox tool, content can be accessed on a computing system without exposing the computing system to any malicious agents that may be contained in the content. Because the sandbox tool utilizes cgroup controls that limit hardware resource usage, application programs can be allowed to execute in the isolated execution environment, but are prevented from highjacking all the hardware resources of the computing system. As such, the content can be accessed without the worry of potential DOS attacks on the computing system.

FIG. 1 illustrates an exemplary network 100 of computing systems, according to various embodiments. It should be readily apparent to those of ordinary skill in the art that the network 100 depicted in FIG. 1 represents a generalized schematic illustration and that other components may be added or existing components may be removed or modified. Moreover, the network 100 may be implemented using software components, hardware components, or combinations thereof.

As illustrated in FIG. 1, the network 100 can represent the systems of private entities, such as individuals, businesses, partnerships, companies, corporations, etc., and public entities, such as universities, governmental agencies, etc. The network 100 can include a number of computing systems, such as a user computing system 102 and remote computing systems 104. The computing systems, such as the user computing system 102 and remote computing systems 104, can be any-type of computing systems such as desktops, laptops, servers, thin-clients, etc. The computing systems, such as the user computing system 102 and remote computing systems 104, can include hardware resources, such as processors, memory, network hardware, storage devices, and the like, and software resources, such as operating systems (OS), application programs, and the like.

The user computer system 102 can include a secure OS 106, such as security enhanced Linux ("SELinux"), available from Red Hat™, Inc. In this example, SELinux implements a monolithic kernel which is configured to provide an X-Window computing environment to the user computing system 102. SELinux is a version of Linux that integrates FLASK architectural components to provide general support for the enforcement of many kinds of mandatory security policies, including those based on the concepts of type enforcement, role-based access control ("RBAC"), and multi-level security ("MLS").

Additionally, the secure OS 106 can implement cgroups. Cgroups define processes' access to and utilization of the hardware resources of the user computing system 102. Once a process is assigned to a cgroup, that process is limited to the hardware resources defined by the cgroup. A cgroup can define particular hardware resources that processes, which are assigned to that cgroup, are allowed to access and utilize. For example, a cgroup can define one or more processors in a multi-processor system, one or more threads in a multi-thread processor, a particular memory range, and/or other hardware (disk drives, network devices, etc.) that the processes are allowed to access and utilize. A cgroup can also define amounts of the hardware resources that the processes, which are assigned to that cgroup, are allowed to access and utilize. For example, a cgroup can define a percentage of processing power, a percentage of memory, and/or a percentage of storage that the processes are allowed to access and utilize. A cgroup can also define components of the hardware resources that the processes, which are assigned to that cgroup, are allowed to access and utilize. For example, a cgroup can define particular ports of a network device that processes are allowed to access. If a process attempts to utilize the hardware resources outside the definition of the cgroup, the secure OS 106 can block the process's access or scale back its usage of the hardware resources.

The computing systems in environment 100 can be located at any location, whether located at single geographic location or remotely located from each other. In order to communicate and share data, the user computing system 102 and the remote computing systems 104 can be coupled to one or more networks 108. The one or more networks 108 can be any type of communications networks, whether wired or wireless, to allow the computing system to communicate, such as wide-area networks (e.g. Internet) or local-area networks.

A user of the user computing system 102 can utilize the computing environment of the secure OS 106 to operate the computing system 102 and access content on the user computing system 102. The content can include any number and type of data, applications programs such as word processing applications, web browser applications, file sharing applications, electronic mail (e-mail) applications, multimedia applications, chat applications, etc. Likewise, the content can include files and data utilized by the application programs or accessed utilizing the application programs. The content accessed on the user computing system 102 can be acquired from a variety of sources. For example, the content can be installed and copied to the user computing system 102 from media such as compact discs (CDs) and digital versatile discs (DVDs). Likewise, the content can be downloaded from one or more of the remote computing systems 104 via the network 108.

The content accessed on the user computing system 102 may not be secure. For example, the user computing system 102 can acquire the content from one or more of the remote computing systems 104. In this example, the user computing system 102 may not know the source of the content and cannot guarantee that the content is secure. Likewise, content installed and copied from media can be untrusted and possibly insecure. As such, the content can be deemed to be untrusted and can possibly be insecure.

In embodiments, regardless of whether the content is trusted or untrusted, the user of the user computing system 102 can desire to access the content without exposing the user computing system 102 to actions performed by the content or malicious agents (e.g. viruses, Trojans, etc.) possibly contained in the content. In order to allow access of the content without exposing the user computing system 102, the user computing system 102 can include a sandbox tool 110. The sandbox tool 110 can be configured to cooperate with components of the secure OS 106 to create an isolated execution environment for accessing content (trusted or untrusted) without exposing other processes and resources of the user computing system 102 to the content. In particular, the sandbox tool 110 can be configured to allocate resources (storage space, memory, etc) of the user computing system 102, which are necessary to create the isolated execution environment, and apply security polices of the secure OS 106 to the isolated execution environment such that content running in the isolated execution environment can only access the resources allocated to the isolated execution environment. As such, the user can access the content without exposing the user computing system 102 to any possible malicious, dangerous, or damaging content.

According to embodiments, the sandbox tool 110 can be configured to utilize cgroups when creating the isolated execution environment. In particular, the sandbox tool 110 can determine a cgroup to apply the the isolated execution environment, apply the cgroup to the isolated execution environment, and cooperate with the secure OS 106 to confine the isolated execution environment's use of the hardware resources to the hardware resources defined by the applied cgroup. Accordingly, any content, accessed or executed in the isolated execution environment, can be prevented from highjacking all the hardware resources of the user computing system 102.

For example, the sandbox tool 110 can apply a cgroup to the isolated execution environment that defines the maximum processor usage to 20% and the maximum memory usage to 30%. If dangerous content within the isolated execution environment attempts to perform a DOS attack on the user computing system 102 by consuming 100% processor usage and/or 100% memory usage, the secure OS can limit the isolated execution environment's hardware resource usage to the amounts specified in the cgroup (processor usage—20%, the maximum memory usage—30%). As such, the dangerous content can be prevented from rendering the user computing system 102 unusable.

The content (trusted or untrusted) can be applications, programs, files, and/or data. The sandbox tool 110 can be configured to create the isolated execution environment to allow the applications, programs, files, and/or data to be accessed, executed, or viewed without exposing the user computing system 102 to any possible malicious, dangerous, or damaging actions of the content. For example, the applications, programs, files, and/or data can only access the resources allocated to the isolated execution environment.

In embodiments, as illustrated, the sandbox tool 110 can be implemented as part of the secure OS 106. Likewise, the sandbox tool 110 can be implemented as a standalone application program that communicates with the components of the secure OS 106. In either case, the sandbox tool 110 can be written in any type of known open-source or proprietary programming language, such as C, C++, JAVA, etc.

In embodiments, the user computing system 102 can store and execute the secure OS 106 and sandbox tool 110. Additionally, one or more of the remote computing systems 104 can store and execute the secure operating system 106 and the sandbox tool 110. As such, the user computing system 102 can access the secure OS 106 and the sandbox 110 stored on the one or more remote computing system 104 via the network 108 in order to access content using a client-server model.

Figure 2:
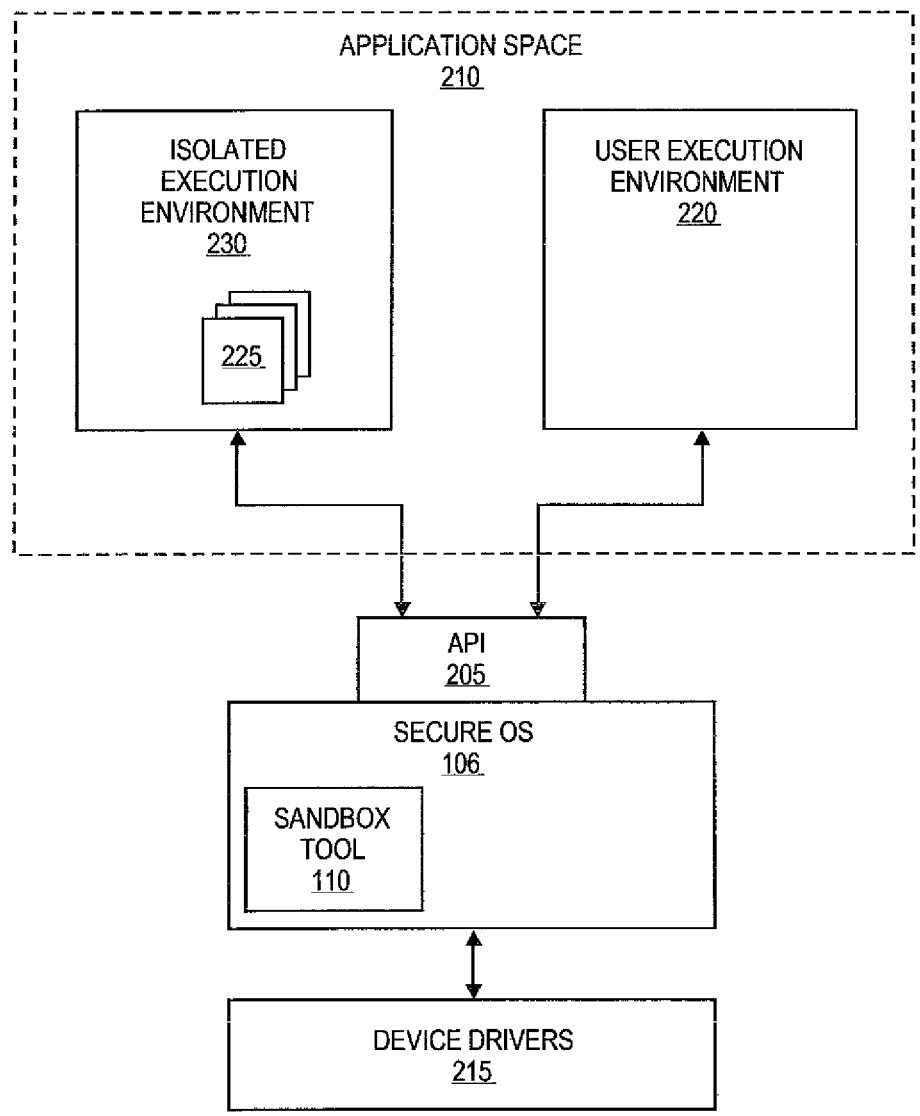
FIG. 2 illustrates an exemplary software environment for utilizing an isolated execution environment, according to various embodiments of the present teachings.

FIG. 2 illustrates an exemplary software environment in accordance with various embodiments. It should be readily apparent to those of ordinary skill in the art that software environment depicted in FIG. 2 represents a generalized schematic illustration and that other components may be added or existing components may be removed or modified.

As shown in FIG. 2, the software environment can include the secure OS 106, such as SELinux or similar secure multitasking, multi-user operating system. A run-time environment (not shown) can be configured to execute on the secure OS 106. The run-time environment can provide a set of software that supports the access of content (e.g. applications, files, data, etc.). The run-time environment can also comprise an application program interface ("API") 205 and a complementary API (not shown) within an application space 210.

The API 205 can be configured to provide a set of routines that the application space 210 uses to request lower-level services performed by the secure OS 106. The secure OS 106 can include a kernel (not shown) and device drivers 215. The kernel can be configured to provide secure access to the underlying hardware of the user computing system 102 (e.g. processor, memory, storage, input/output devices, network devices, etc.) through the device drivers 215.

During operation, the secure OS 106 can be configured to create a user execution environment 220 in the application space 210. The user execution environment 220 allows users to interact with the the user computing system 102 to access content such as run application and programs, view files, etc. The secure OS 106 can be configured to perform the necessary processes to establish the user execution environment 220 such as creating a virtual process server (e.g. X-server) to support user interaction with the user execution environment 220, providing access to the devices drivers 215, allocating resources (e.g. user namespace such as home directory and temporary directory) to support the user execution environment 220, and the like. Likewise, the secure OS 120 can enforce security policies in the user execution environment 220 to allow/prevent access to underlying resources (network ports, file directories, memory, etc.) of the user computing system 102. The secure OS 106 can also be configured to generate and display, to the user, a user interface, typically a "desktop" graphical user interface (GUI), that allows the user to interact with the user computing system 102. The desktop GUI communicates with the virtual process server to receive input from the user and display output to the user.

In embodiments, in order to provide access to content 225 without endangering the user computing system 102, the sandbox tool 110 can be configured to cooperate with components of a secure OS 106, to create an isolated execution environment 230 for accessing content 225 (trusted or untrusted) without exposing other processes such as the user execution environment 220 and resources of the user computing system 102 to the content 225. In particular, the sandbox tool 110 can be configured to allocate resources (storage space, memory, etc) of the user computing system 102, which are necessary to create the isolated execution environment 230. The sandbox tool 110 can be configured to apply security polices of the secure OS 106 to the isolated execution environment 230 such that the content 225 running in the isolated execution environment 230 can only access the resources allocated to the isolated execution environment 230. The isolated execution environment 230 can provide the same functionality as the user execution environment 220, but be isolated from the user execution environment 220 and limited in its access to the resources of the user computing system 102. A description of the sandbox tool 110 and secure OS 106 and a description of creating an isolated execution environment can be found in U.S. patent application Ser. No. 12/545,500 (U.S. Patent Application Publication No. 2011/0047613), entitled "SYSTEMS AND METHODS FOR PROVIDING AN ISOLATED EXECUTION ENVIRONMENT FOR ACCESSING UNTRUSTED CONTENT" to Daniel J. Walsh et al.; U.S. patent application Ser. No. 12/640,657 (U.S. Patent Application Publication No. 2011/0154431), entitled "SYSTEMS AND METHODS FOR PROVIDING MULTIPLE ISOLATED EXECUTION ENVIRONMENTS FOR SECURELY ACCESSING UNTRUSTED CONTENT" to Daniel J. Walsh; and U.S. patent application Ser. No. 12/789,554 (U.S. Patent Application Publication No. 2011/0296487), entitled "SYSTEMS AND METHODS FOR PROVIDING AN FULLY FUNCTIONAL ISOLATED EXECUTION ENVIRONMENT FOR ACCESSING CONTENT" to Daniel J. Walsh, all of which are assigned to Red Hat Corporation, the disclosures of which are incorporated herein, in their entirety, by reference.

In embodiments, the sandbox tool 110 can be configured to utilize cgroups with the isolated execution environment 230 in order to control the hardware resources available to the isolated execution environment 230. As such, any processes running in the isolated execution environment 230, such as potentially harmful content, will be limited to the hardware resources defined by the applied cgroup. As a result, the sandbox tool 110 can prevent any content accessed or executed in the isolated execution environment from high-jacking the user computing system 102.

The sandbox tool 110 can be configured to apply cgroups that define accessible hardware resources by particular hardware resources, amount of hardware resources, and/or components of the hardware resources. For example, a cgroup can define one or more specific processors in a multi-processor system that are accessible, one or more threads in a multi-thread processor that are accessible, a particular memory range that is accessible, and/or other hardware that is accessible (disk drives, network devices, etc.). Likewise, for example, a cgroup can define a percentage of processing power that is accessible, a percentage of memory that is accessible, and/or a percentage of storage that is accessible. Additionally, for example, a cgroup can define particular ports of a network device that are accessible. If a process attempts to utilize the hardware resources outside the definition of the cgroup, the secure OS 106 can block the process's access or scale back its usage of the hardware resources.

During the creation of the isolated execution environment 230, the sandbox tool 110 can be configured to determine a cgroup to apply to the isolated execution environment 230. The sandbox tool 110 can be configured to allow a user to create a cgroup during the creation of the isolated execution environment 230. To achieve this, the sandbox tool 110 can be configured to generate and provide to the user command line interfaces and/or graphical user interfaces (GUIs) that enable the user to specify the hardware resources that are accessible to the isolated execution environment 230. For example, the user can utilize the command line interfaces or GUIs to specify particular hardware resources to be included in the cgroup, amount of hardware resources to be included in the cgroup, and/or components of the hardware resources to be included in the cgroup.

Likewise, the sandbox tool 110 and/or the secure OS 106 can be configured to maintain predefined cgroups that can be applied to the isolated execution environment 230. The predefined cgroups can specify various levels of access to the hardware resources of the user computing system 102. The predefined cgroups can define any combination of particular hardware resources, amount of hardware resources, and/or components of the hardware resources that are accessible. During creation of the isolated execution environment 230, the sandbox tool 110 can be configured to display the predefined cgroups in the command line and/or GUIs and receive a selection of one of the predefined cgroups from the user. Additionally, the sandbox tool 110 can automatically apply one of the predefined cgroups to the isolated execution environment 230 as a default.

Once determined, the sandbox tool 110 can be configured to apply the cgroup to the isolated execution environment 230. The sandbox tool 110 can be configured to cooperate with the secure OS 106 to mount the cgroup with the isolated execution environment 230. As such, any processes running in the isolated execution environment 230 will be limited to the hardware resources specified by the applied cgroup.

In embodiments, the sandbox tool 110 can be configured to create and/or maintain one or more isolated execution environments 230, simultaneously. The sandbox tool 110 can create one or more isolated execution environments 230 which co-exist and have the same or different level of access, but remain isolated from each other. Likewise, in embodiments, the sandbox tool 110 can be configured to apply the same cgroup to the multiple isolated execution environments. As such, the multiple isolated execution environments would share the defined hardware resources of the cgroup. For example, if the cgroup defined a limit of 20% processor usage, the combined processor usage of the multiple isolated execution environments could not exceed 20%. Additionally, the sandbox tool 110 can be configured to apply different cgroups to one or more of the multiple isolated execution environments. As such, each isolated execution environment would be limited to the hardware resources defined by the applied cgroup.

Additionally, when assigning cgroups to the multiple isolated execution environments, the sandbox tool 110 can be configured to apply cgroups in a hierarchical structure. The sandbox tool 110 can be configured to apply any overall cgroup to all of the multiple isolated execution environments and apply a separate cgroup to each of the multiple isolated execution environments. If the combined hardware resource usage of multiple isolated execution environments exceed the hardware resources defined by the overall cgroup, the sandbox tool 110 and/or secure OS 106 can be configured to limit access to hardware resources of one or more of the multiple isolated execution environments in order that the combined hardware resource usage meets the overall cgroup. For example, the sandbox tool 110 can apply an overall cgroup of a maximum of 50% processor usage and a separate cgroup to each of three multiple isolated execution environments of a maximum of 30% processor usage. In this example, each of the three multiple isolated execution environments would be individually limited to 30% processor usage, and the combined processor usage of all three would be limited to 50% processor usage. If two of the three multiple isolated execution environments were utilizing 20% each, the third of the three multiple isolated execution environments would be limited to 10% processor usage, or the sandbox tool 110 and/or the secure OS 106 can scale back the processor usage of the two of the three multiple isolated execution environments. While the above describes one example of a hierarchical cgroup control, one skilled in the art will realize that the sandbox tool 110 and/or the secure OS 106 can utilize any type of hierarchical cgroups with any number of levels in the hierarchy.

Additionally, in embodiments, the sandbox tool 110 and/or the secure OS 106 can utilize dynamic cgroups. The dynamic cgroups can specify conditions by which the hardware resources defined by the cgroups can change. The conditions can be any conditions that exits in the user computing system 102. For example, the sandbox tool 110 and/or the secure OS 106 can apply a dynamic cgroup to an isolated execution environment that defines a limit of processor usage to 50% on the condition that total processor usage of the user computing system 102 does not exceed 90%. In this example, if the processor usage of the user computing system exceeds 90% due to other processes running outside the isolated execution environment, the sandbox tool 110 and/or the secure OS 106 can reduce the processor usage of the isolated execution environment to maintain less than a 90% processor usage for the entire system. While the above describes one example of dynamic cgroups with reference to processor usage one skilled in the art will realize that dynamic cgroups can be applied to any type of hardware resource, whether particular hardware usage or particular amounts of hardware usage. Likewise, while the above describes one example in which hardware usage can change based on a single condition, one skilled in the art will realize that hardware usage can change based on any number and types of condition that exist in the user computing system 102.

Figure 3:
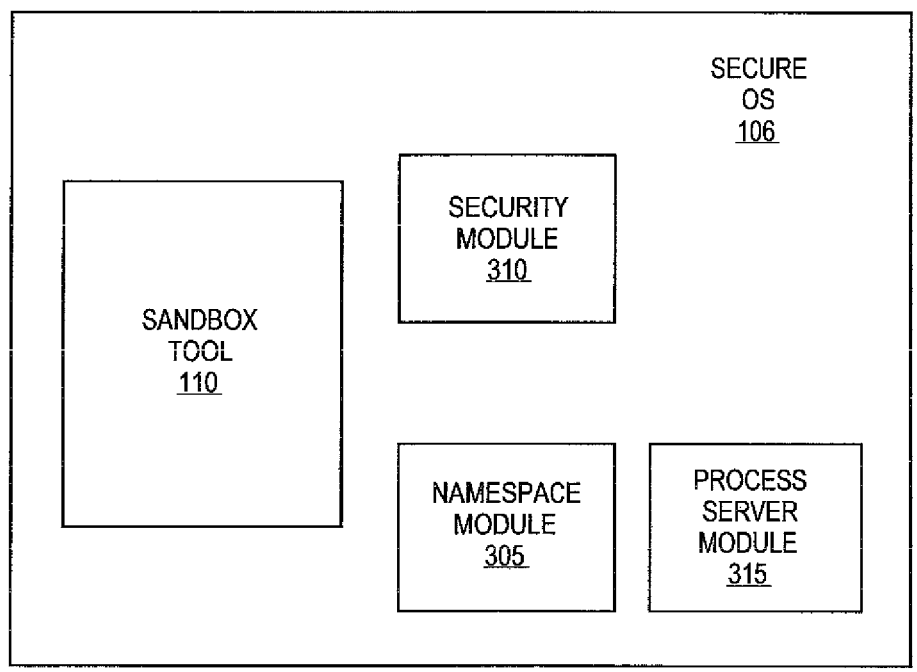
FIG. 3 illustrates components of an exemplary secure operating system including a sandbox tool, according to various embodiments.

FIG. 3 shows an exemplary block diagram of the secure OS 106 including the sandbox tool 110 according to various embodiments. It should be readily apparent to those of ordinary skill in the art that the secure OS 106 depicted in FIG. 3 represents a generalized schematic illustration and that other components may be added or existing components can be removed or modified. Likewise, while FIG. 3 illustrates the sandbox tool 110 as part of the secure OS 106, those of ordinary skill in the art will realize that the sandbox tool 110 can be implemented as a separate and standalone program or application that can communicate and cooperate with the secure OS 106, and the sandbox tool 110 can incorporate one or more of the components of the secure OS 106.

As shown in FIG. 3, the secure OS 106 can include a namespace module 305, a security module 310, a process server module 315. These components can be incorporated into the secure OS 106 and/or the sandbox tool 110 to implement the functionality of the isolated execution environment 230 as previously described and described in greater detail below.

The namespace module 305 can be configured generate and maintain the namespaces that support the user execution environment 220 and the isolated execution environment 230. More particularly, the namespace module 305 can create directories including a home directory (Homedir), file directory (/tmp) and /var/tmp for the user execution environment 220 and, when necessary, create a home directory and tmp directory for the isolated execution environment 230. Likewise, the namespace module 305 can be configured to remove the namespace of the isolated execution environment 230, if requested.

The security module 310 can be configured to maintain and enforce the security policies of the secure OS 106 according to the security contexts supported by the secure OS 106. The security policies associated with the security contexts can define the various access levels of the processes running on the user computing system 102. For example, the security policies can define the various resources that are accessible at different security contexts such as full or limited network access, full or limited memory access, full or limited storage access, and the like. To enforce the security policies, the security module 310 can be configured to associate a security context with the user execution environment 220 and the isolated execution environment 230. Likewise, the security module 310 can be configured to apply security labels, corresponding to the associated security context, to different processes running on the user computing system 102 by assigning a security label, for example MCS label in SELinux, to different processes. The security label is associated with the secure OS 106 and can identify what security context the security module 310 should apply to the processes running on the user computer system 102. When the processes, which are assigned a particular security label, request access to resources of the user computing system 102, the secure OS 106 can read the security label and apply the associated security policy of the associated security context to the processes, thereby restricting access of the processes to the security context. For example, the security module 310 can allow processes associated with a particular security context and with a particular security label to only access the resources, for example, limit and control access to the device drivers 215, defined by the security policies associated with the particular security context.

In embodiments, the process server module 315 can be configured to implement virtual processes servers for the processes running on the user computing system 102 such as the user execution environment 220 and the isolated execution environment 230. For example, if secure OS 106 is SELinux, the process server module 310 can be configured to implement one or more X Servers which provide X Windows interfaces that allow the user of the user computing system 102 to interact with the processes running on the user computing system 102.

In embodiments, the sandbox tool 110 can be configured to include the necessary logic, instructions, and commands to implement the methods and processes of creating the isolated execution environment 230 as described above and below. The sandbox tool 110 can be configured to cooperate with the secure OS 106 to create the isolated execution environment 230 (e.g. creating/removing namespaces, isolating namespaces, copying content, applying security contexts, accessing the untrusted content 225, and the like). Likewise, the sandbox tool 110 can be configured to cooperate with the secure OS 106 to create and apply cgroups to the isolated execution environment 230.

In embodiments, the sandbox tool 110 can be configured to apply various cgroups to limit the usage of hardware resources by the isolated execution environment 230. The sandbox tool 110 can be configured to apply cgroups that define accessible hardware resources by particular hardware resources, amount of hardware resources, and/or components of the hardware resources. Likewise, the sandbox tool 110 can be configured to create and/or maintain one or more isolated execution environments 230, simultaneously. The sandbox tool 110 can be configured to apply the same or different cgroups to each of the multiple execution environments. The secure OS 106 can limit any processes running in an isolated execution environment 230 to the hardware resources specified by the applied cgroup.

In embodiments, in order to initiate creation of the isolated execution environment 230, the sandbox tool 110 can be configured to allow a user to request creation of the isolated execution environment 230, request creation of a cgroup for isolated execution environment 230, and/or view and select a predefined cgroup to apply to the isolated execution environment 230. As such, the sandbox tool 110 can be configured to include the necessary logic, instructions, and commands to generate command line interfaces and/or GUIs that allow a user to start the sandbox tool 110, request creation of the isolated execution environment 230, provide the specifications of the isolated execution environment 230, and specify the cgroup to apply to the isolated execution environment 230. The user can specify particular hardware resources to be included in the cgroup, amount of hardware resources to be included in the cgroup, and/or components of the hardware resources to be included in the cgroup.

In embodiments, the sandbox tool 110 can be directly accessed in order to initiate creation of the isolated execution environment 230. Additionally, the sandbox tool 110 can be linked to other applications and programs (e.g. web browsers) to allow creation of the isolated execution environment 230.

In embodiments, additionally, in order to initiate creation of the isolated execution environment, the sandbox tool 110 can be configured to automatically initiate access of the content in the isolated execution environment 230. For example, upon the access of certain content, such as particular files or applications, the sandbox tool 110 can automatically initiate creation of the isolated execution environment 230 and access of the content in the isolated execution environment 230. As such, the sandbox tool 110 can be configured to include the necessary logic, instructions, and commands to command line interfaces and/or GUIs that allow selection of types of content 225 which will automatically be accessed in the isolated execution environment 230 and the cgroup to be applied to the isolated execution environment 230.

Figure 4:
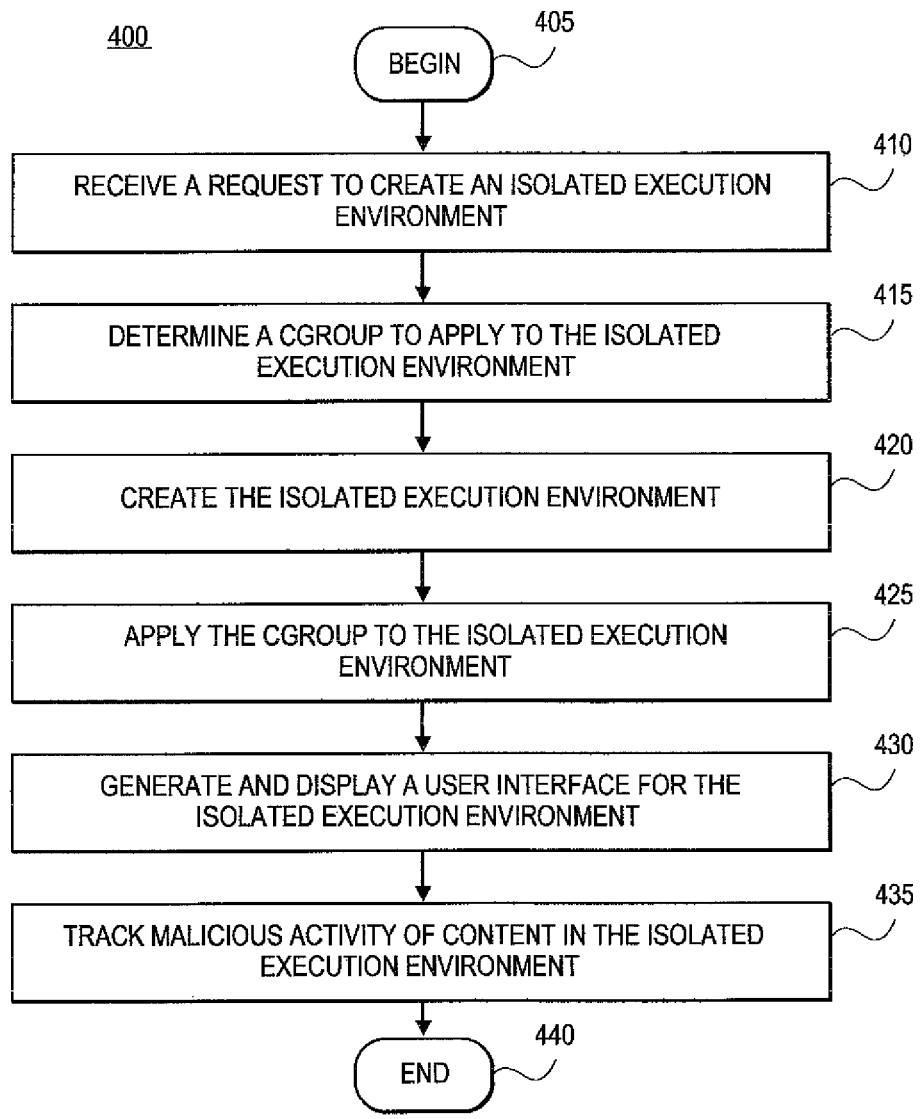
FIG. 4 illustrates an exemplary process for accessing untrusted content in the isolated execution environment with cgroup controls, according to various embodiments.

FIG. 4 depicts an exemplary flow diagram 400 for creating an isolated execution environment with cgroup controls in accordance with various embodiments. It should be readily apparent to those of ordinary skill in the art that the flow diagram 400 depicted in FIG. 4 represents a generalized schematic illustration and that other stages can be added or existing stages can be removed or modified.

In 405, the processing can begin. In 410, the sandbox tool 110 can receive a request to create an isolated execution environment 230. To receive the request, the sandbox tool 110 can provide to the user an interface (command line interface and/or GUI) to receive the request and specifications for the isolated execution environment 230.

In 415, the sandbox tool 110 can determine a cgroup to apply to the isolated execution environment 230. For example, the sandbox tool 110 can receive via the interface (command line interface and/or GUI) an request to create a cgroup and the hardware resources to be defined by the cgroup. The user can specify particular hardware resources to be included in the cgroup, amount of hardware resources to be included in the cgroup, and/or components of the hardware resources to be included in the cgroup. Likewise, the sandbox tool 110 can provide, via the interface, a list of predefined cgroups and the hardware resources defined by the predefined cgroups and can receive a selection of one of the predefined cgroups.

In 420, the sandbox tool 110 can create the isolated execution environment 230. For example, the sandbox tool 110 can create the namespace for the isolated execution environment 230. Then, the sandbox tool 110 can copy necessary content and content 225 to the namespace for the isolated execution environment 230. Next, the sandbox tool 110 can optionally create an execution file in the namespace of the isolated execution environment 230. Then, the sandbox tool 110 can isolate the namespace of the isolated execution environment 230 for other namespaces such as the namespace of the user execution environment 220. Additionally, the sandbox tool 110 can create a new virtual process server for the isolated execution environment 230 and can apply the security context to the isolated execution environment 230. The sandbox tool 110 can apply or can instruct the security module 310 to apply security labels within the security context to the processes running the isolated execution environment 230. After creation, the sandbox tool 110 can remove any data used to create the isolated execution environment 230.

In 425, the sandbox tool 110 can apply the cgroup to the isolated execution environment 230. The sandbox tool 110 can cooperate with the secure OS 106 to mount the cgroup with the isolated execution environment 230. As such, any processes running in the isolated execution environment 230 will be limited to the hardware resources specified by the applied cgroup.

In 430, the sandbox tool 110 can generate and display a user interface for the isolated execution environment 230. For example, if the new virtual process server is an X Windows server, the sandbox tool 110 can instruct, directly or via the process server module 315, to generate and maximize the X windows, generated by the new X Server, in the user interface of the user execution environment 220 (e.g. desktop GUI).

In 435, the sandbox tool 110 can optionally track malicious activity of the content 225. The sandbox tool 110 can track or instruct the security module 310 to track malicious activity from the content 225. For example, the sandbox tool 110 and/or security module 310 can monitor if the isolated execution environment 230 accesses or exceeds the limited hardware resources specified by the cgroup and can notify the user via the interface.

In 440, the processing can end, repeat or return to any point.

Figure 5A:
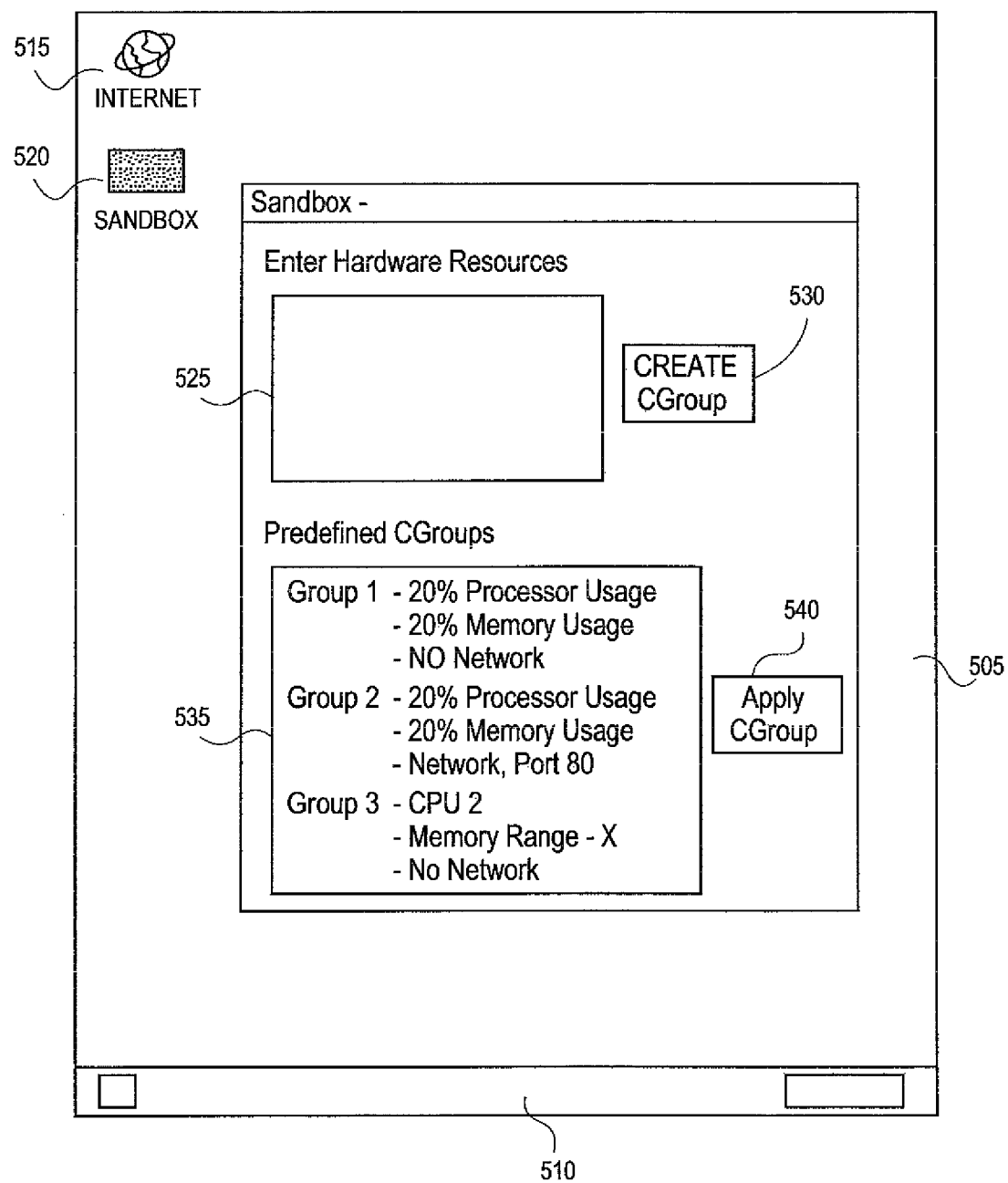
FIGS. 5A and 5B illustrate exemplary interfaces for the isolated execution environment with cgroup controls, according to various embodiments.
Figure 5B:
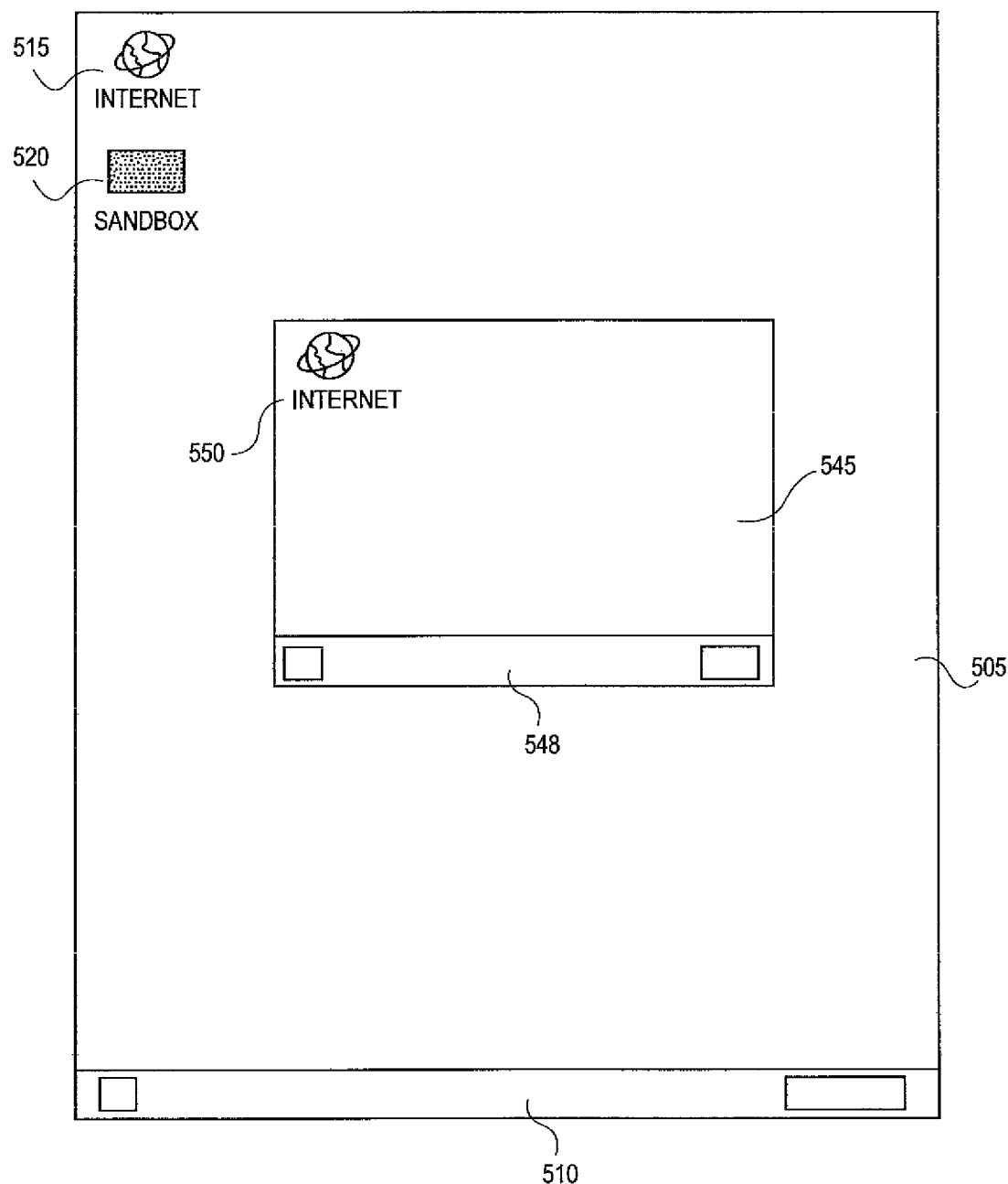

FIGS. 5A and 5B are exemplary screen shots of various methods and processes of initiating creation of an isolated execution environment with cgroup controls. As illustrated in FIG. 5A, the secure OS 106, running on the user computing system 102, can provide the user execution environment 220 with a user interface or desktop GUI 505, such as an X Windows interfaces, that allows a user to run applications programs, view files and data, and communicate with the remote computing systems 104. The desktop GUI 505 can include various menus and widgets for accessing application programs, such as a tool bar 510 and application icon 515 for accessing a web browser application program.

The user desktop 505 can include a sandbox icon 520 for initiating the sandbox tool 110. Once the sandbox icon 520 is selected, the sandbox tool 110 can generate and display a sandbox interface 522. The sandbox interface 522 can include fields to allow the user to request that a cgroup be applied to the isolated execution environment 230. As illustrated, for example, the sandbox interface 522 can include a text box 525 for entering hardware resources to be defined by a cgroup and a widget 530 for creating and applying a cgroup as specified in the text box 525. Additionally, the sandbox interface 522 can include a menu 535 for displaying and selecting predefined cgroups and a widget 540 for applying one of the predefined cgroups.

Once a new cgroup is created or a predefined cgroup is selected, the sandbox tool 110 can create the isolated execution environment 230, as described above. As illustrated in FIG. 5B, the sandbox tool 110 can display a user interface 545 for the isolated execution environment 230 in the desktop GUI 505. The user interface 545 can include various menus and widgets for accessing application programs, such as a tool bar 548 and application icon 550 for accessing a web browser application program. The isolated execution environment 230 will be limited to the hardware resources defined in the cgroup that was applied to the isolated execution environment 230.

Figure 6:
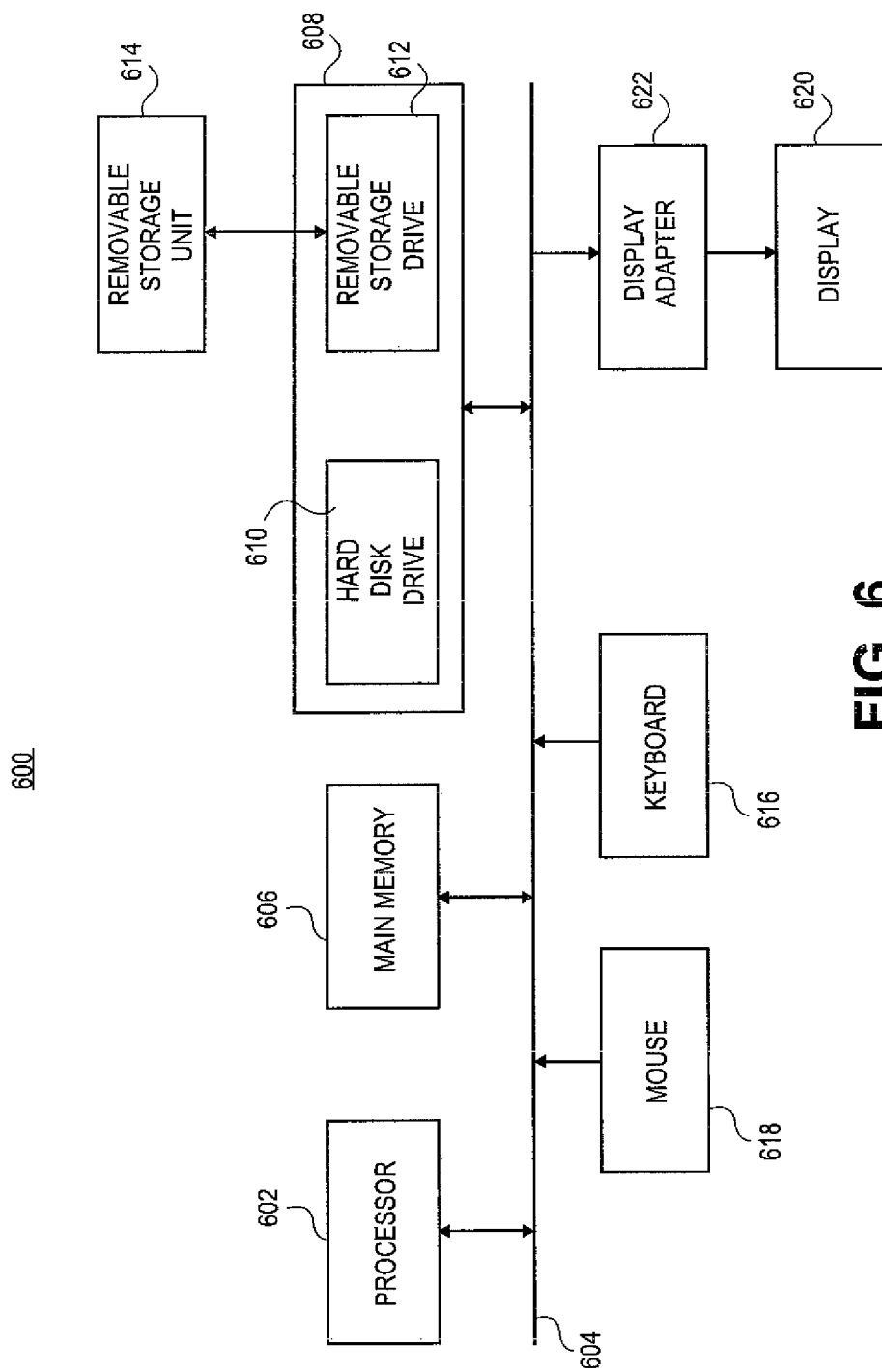
FIG. 6 illustrates an exemplary computing system which can implement the secure operating system and the sandbox tool, according to various embodiments.

FIG. 6 illustrates an exemplary block diagram of a computing system 600 which can be implemented as user computing system 102 and/or the remote computing systems 104 according to various embodiments. The functions of the secure OS 106 and the sandbox tool 110 can be implemented in program code and executed by the computing system 600.

As shown in FIG. 6, the computing system 600 includes one or more processors, such as processor 602 that provide an execution platform for embodiments of the secure OS 106 and the sandbox tool 110. Commands and data from the processor 602 are communicated over a communication bus 604. The computing system 600 also includes a main memory 606, for example, one or more computer readable storage media such as a Random Access Memory (RAM), where the secure OS 106 and the sandbox module 110 can be executed during runtime, and a secondary memory 608. The secondary memory 608 includes, for example, one or more computer readable storage media such as a hard disk drive 610 and/or a removable storage drive 612, representing a floppy diskette drive, a magnetic tape drive, a compact disk drive, etc., where a copy of a software version of the secure OS 106 and the sandbox tool 110 can be stored. The removable storage drive 612 reads from and/or writes to a removable storage unit 614 in a well-known manner. A user can interfaces with the secure OS 106 and the sandbox tool 110 with a keyboard 616, a mouse 618, and a display 620. A display adapter 622 interfaces with the communication bus 604 and the display 620. The display adapter 622 also receives display data from the processor 602 and converts the display data into display commands for the display 620.

Certain embodiments may be performed as a computer application program. The application program may exist in a variety of forms both active and inactive. For example, the application program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the application program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method, comprising:
    receiving, by a processor, a request to create an isolated execution environment within a host environment controlled by an operating system executing on a computing system;
    creating, by the processor, a new process server to support communications with one or more processes to be executed in the isolated execution environment;
    assigning, by the processor, a security context to the new process server, wherein the creating of the new process server and the assigning of the security context to the new process server creates the isolated execution environment within the host environment, wherein the isolated execution environment is isolated from the host environment;
    creating, by the processor, a user interface for the isolated execution environment in communication with the new process server;
    displaying, by the processor, the user interface on a display device of the computing system;
    receiving, by the processor, identification of hardware resources of the computing system to be specified in a control group of the operating system, wherein the control group specifies an amount of each hardware resource of the hardware resources that are accessible to the isolated execution environment; and
    applying, by the processor, the control group to the isolated execution environment, the control group specifying hardware resources of the computing system that are accessible to the isolated execution environment.

2. The method of claim 1, wherein the control group is a predefined control group.

3. The method of claim 1, wherein the control group specifies particular hardware resources that are accessible to the isolated execution environment.

4. A non-transitory computer readable storage medium having instructions stored thereon, that when executed by a processor, cause the processor to perform operations, comprising:
    receiving, by the processor, a request to create an isolated execution environment within a host environment controlled by an operating system executing on a computing system;
    creating, by the processor, a new process server to support communications with one or more processes to be executed in the isolated execution environment;
    assigning, by the processor, a security context to the new process server, wherein the creating of the new process server and the assigning of the security context to the new process server creates the isolated execution environment within the host environment, wherein the isolated execution environment is isolated from the host environment;
    creating, by the processor, a user interface for the isolated execution environment in communication with the new process server;
    displaying, by the processor, the user interface on a display device of the computing system;
    receiving, by the processor, identification of hardware resources of the computing system to be specified in a control group of the operating system, wherein the control group specifies an amount of each hardware resource of the hardware resources that are accessible to the isolated execution environment; and
    applying, by the processor, the control group to the isolated execution environment, the control group specifying hardware resources of the computing system that are accessible to the isolated execution environment.

5. The non-transitory computer readable storage medium of claim 4, wherein the control group is a predefined control group.

6. The non-transitory computer readable storage medium of claim 4, wherein the control group specifies particular hardware resources that are accessible to the isolated execution environment.

7. A computing system, comprising:
    a memory storing instructions; and
    a hardware processor coupled to the memory that executes the instructions to:

receive a request to create an isolated execution environment within a host environment controlled by an operating system executing on the computing system;

create a new process server to support communications with one or more processes to be executed in the isolated execution environment;

assign a security context to the new process server, wherein the creating of the new process server and the assigning of the security context to the new process server creates the isolated execution environment within the host environment, wherein the isolated execution environment is isolated from the host environment;

create a user interface for the isolated execution environment in communication with the new process server;

display the user interface on a display device of the computing system;

receive identification of hardware resources of the computing system to be specified in a control group of the operating system, wherein the control group specifies an amount of each hardware resource of the hardware resources that are accessible to the isolated execution environment; and apply the control group to the isolated execution environment, the control group specifying hardware resources of the computing system that are accessible to the isolated execution environment.

8. The computing system of claim 7, wherein the control group is a predefined control group.

9. The computing system of claim 7, wherein the control group specifies particular hardware resources that are accessible to the isolated execution environment.

\* \* \* \* \*